United States Patent [19]

Terazoe

[11] Patent Number: 5,347,691
[45] Date of Patent: Sep. 20, 1994

[54] CLIP ASSEMBLY

[75] Inventor: Masahiko Terazoe, Kariya, Japan

[73] Assignee: Kabushiki Kaisha Toyoda Jidoshokki Seisakusho, Kariya, Japan

[21] Appl. No.: 1,159

[22] Filed: Jan. 7, 1993

[30] Foreign Application Priority Data

Jan. 10, 1992 [JP] Japan ............................ 4-000597[U]

[51] Int. Cl.⁵ .............................................. F16B 5/00
[52] U.S. Cl. ...................................... 24/295; 24/289; 24/293
[58] Field of Search ................. 24/295, 296, 289, 293; 293/102; 296/39.2, 146.7

[56] References Cited

U.S. PATENT DOCUMENTS

| 2,598,776 | 6/1952 | Flora | 24/295 |
|---|---|---|---|
| 2,689,027 | 9/1954 | Flora | 24/295 |
| 3,208,119 | 9/1965 | Seckerson | 24/295 |
| 4,402,118 | 9/1983 | Benedetti | 24/295 |
| 4,657,296 | 4/1987 | Nishii et al. | 293/102 |

FOREIGN PATENT DOCUMENTS

| 0886979 | 8/1953 | Fed. Rep. of Germany | 24/295 |
|---|---|---|---|
| 2125431 | 11/1972 | Fed. Rep. of Germany | 24/295 |
| 2496188 | 6/1982 | France | 24/295 |
| 59-150009 | 3/1983 | Japan . | |
| 60-148174 | 3/1984 | Japan . | |
| 63-126153 | 2/1987 | Japan . | |
| 0885396 | 12/1961 | United Kingdom | 24/295 |

Primary Examiner—Victor N. Sakran
Attorney, Agent, or Firm—Brooks Haidt Haffner & Delahunty

[57] ABSTRACT

A clip assembly is used to connect a base member, such as a vehicle bumper, to a fitting member, such as an ornamental plate. The base member includes a plurality of projections, and the fitting member includes a plurality of corresponding through holes. The projections of the base member are inserted through the through holes of the fitting member. The fitting member is secured to the base member by means of the projections which are clamped by a plurality of clips. A plurality of holding members retain the clips in position during installation, and are disposed around the through holes.

19 Claims, 8 Drawing Sheets

CLIP ASSEMBLY

BACKGROUND OF THE INVENTION

1. Field of the Invention

The present invention relates to a clip assembly, and more particularly to a clip assembly for securely connecting components to a bumper, a garnish or other parts of an automobile.

2. Description of the Related Art

Recent aerodynamic designs of automobiles require that certain openings be made along the bumpers, allowing a see-through view of the components behind the bumpers. The aesthetic appearance of the bumper can be improved by covering the opening with an ornamental plate, without affecting the aerodynamic characteristics of the bumper design.

Figure 6:
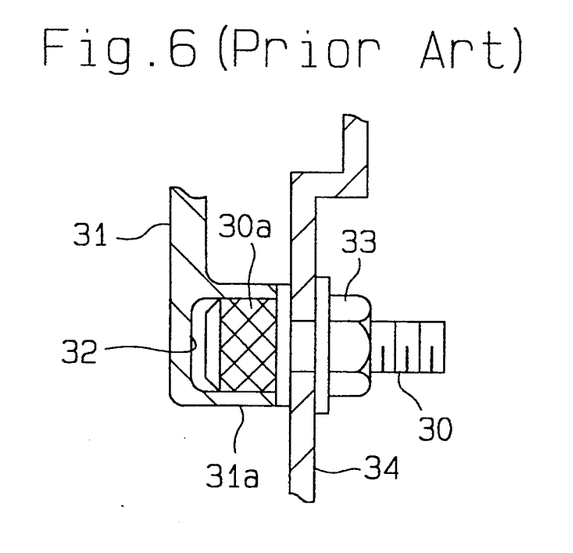
FIG. 6 is a fragmentary cross sectional view of a conventional assembly using an embedded bolt.

The ornamental plate could be integrally formed with synthetic resin bumpers. However, when the plate and the bumper require different coloring, the plate must be masked when painting the bumper. This additional masking step would add complexity to the painting operation. Numerous assemblies have been proposed to connect the ornamental plate to the bumper. One such exemplary assembly is illustrated in FIG. 6, and includes a bolt 30, which is partly embedded within the bumper. A recess 32, with a slightly smaller diameter than that of the bolt head, is made at the peripheral edge of an opening 31a (only a portion is shown) in the rear side of a bumper 31. The bolt head is knurled, and the bolt 30 is secured to the bumper 31 by fitting the head into the recess 32. An ornamental plate 34 is secured to the bumper 31 by bolting it with the bolt 30 and a nut 33. Since the bolt is embedded within the bumper, the production of the bumper becomes complicated. Further, since the bolt head requires knurling, the manufacturing cost is increased.

Figure 7:
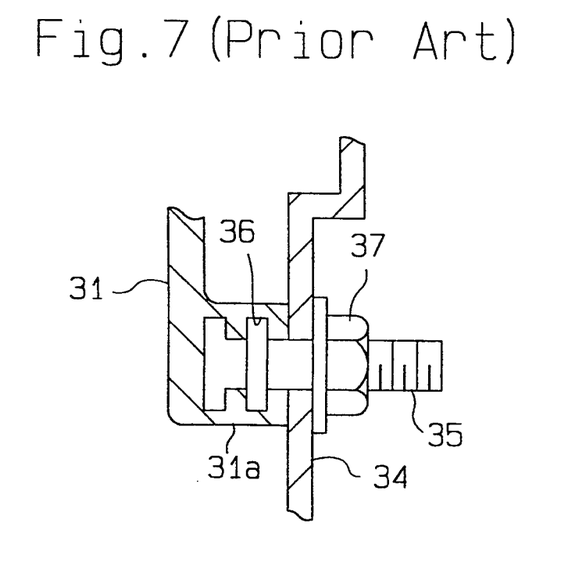
FIG. 7 is a fragmentary cross sectional view of another conventional assembly using a T-shaped bolt.

Another exemplary conventional assembly is illustrated in FIG. 7, and includes a T-shaped bolt 35. A groove 36, is T-shaped, and is formed at the peripheral edge of the opening 31a, in the rear side of the bumper 31. The T-shaped bolt 35 is inserted into the groove 36 from the side. The ornamental plate 34 is secured to the bumper 31, via the T-shaped bolt 35 and a nut 37. This design requires a mold for casting the bumper 31 and a slide mold corresponding to the slide groove 36. Therefore, the casting of the bumper 31 becomes complicated, and the manufacturing cost is increased.

Figure 8:
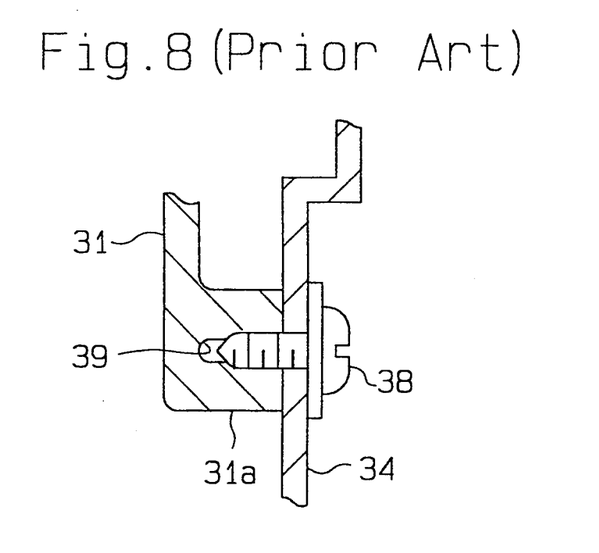
FIG. 8 is a fragmentary cross sectional view of yet another conventional assembly using a tapping screw.

Yet another exemplary assembly is illustrated in FIG. 8, and includes a tapping screw 38. A hole 39, having a smaller diameter than that of the tapping screw 38, is formed in the peripheral edge of the opening 31a, in the rear side of the bumper 31. The ornamental plate 34 is secured to the bumper 34 by screwing the tapping screw 38 into the hole 39, for holding the ornamental plate 34 to the bumper 31. However, the casting process of the bumper 31 requires that it be provided with a casting pin. The use of such a pin presents the disadvantage that it might readily break under the contraction force generated by a large component such as the bumper, during the cooling period.

Figure 9:
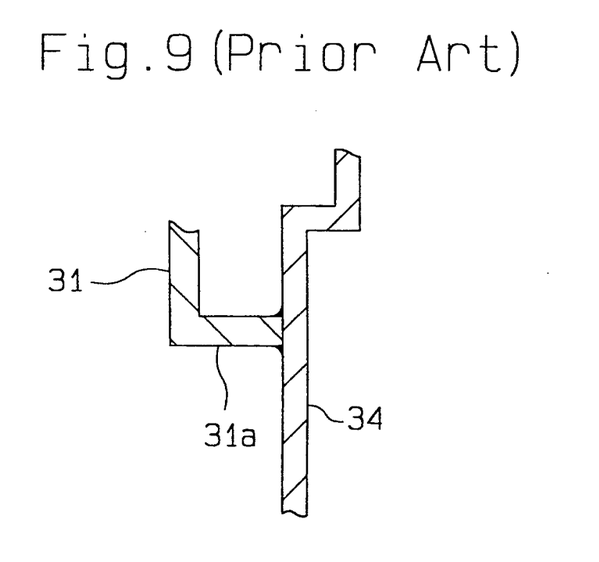
FIG. 9 is a fragmentary cross sectional view of still another conventional assembly using a bonding process.

Still another exemplary assembly is illustrated in FIG. 9. The ornamental plate 34 is bonded to the opening 31a of the bumper 31 by a high frequency bonding process, which requires expensive and bulky equipment such as a high frequency bonding machine.

Figure 10:
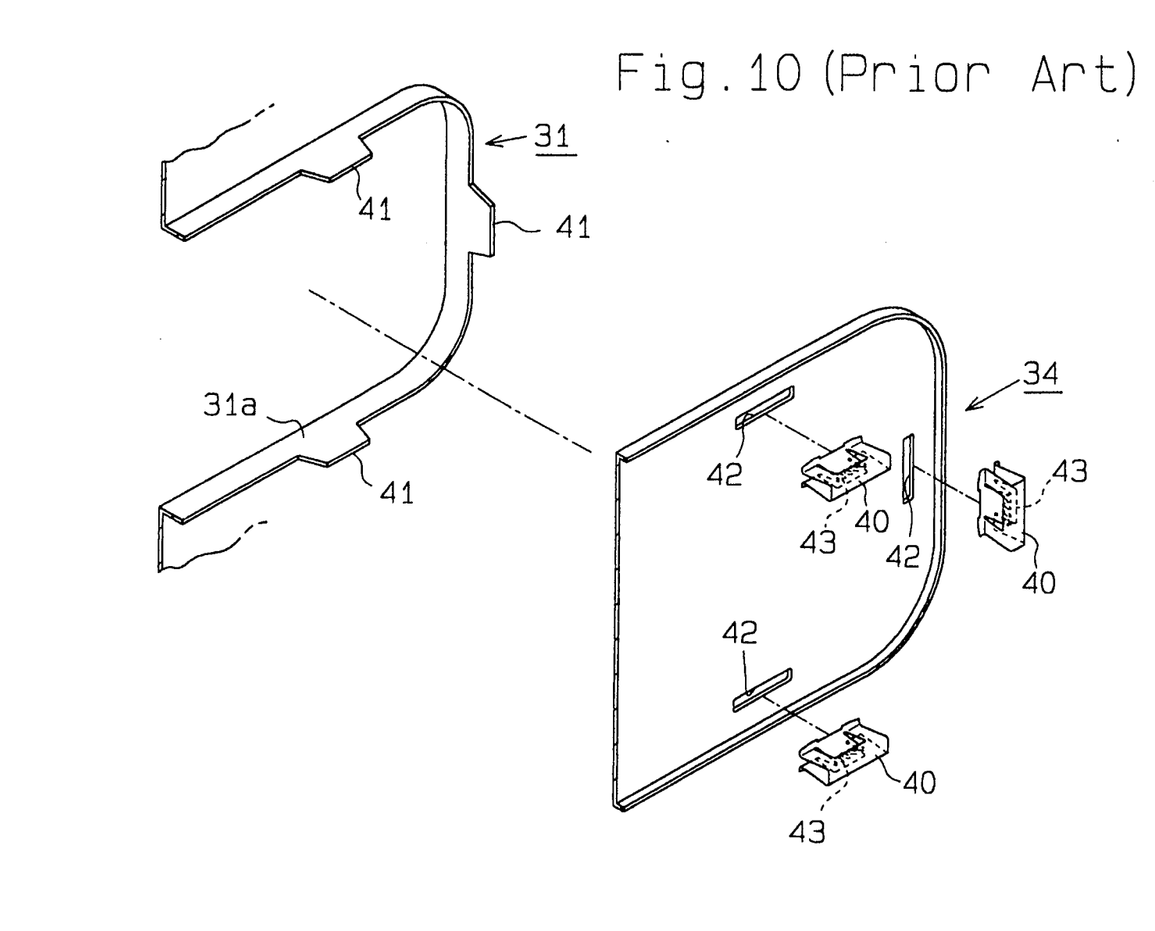
FIG. 10 is a fragmentary exploded perspective view illustrating a conventional clip apparatus for attaching the ornamental plate to the bumper.

Another conventional assembly is illustrated in FIG. 10, and includes clips 40. This assembly further includes a plurality of projections 41 that are formed around the opening 31a in the rear side of the bumper 31. A plurality of through holes 42 are formed in the ornamental plate 34, and correspond to the projections 41. The plate 34 is first secured to the bumper 31 by inserting the projections 41 into the corresponding through holes 42. The clips 40 are then attached to the projections 41, which protrude through the corresponding through holes 42. The ornamental plate 34 is secured to the bumper 31 by urging the clip 40 deep enough to abut against the plate 34. A plurality of bites 43 are formed in each clip 40, and act against the projections 41, for preventing the plate 34 from getting detached. As a result, the plate 34 is secured at a predetermined position in the bumper 31.

However, the surfaces on which the plates 34 are installed, are not always facing in the upward direction. Certain installation surfaces of the bumper 31 sometimes face sideways or downward. In this case, the clip 40 must be installed with one hand while the plate 34 is held by the other hand, in order to prevent the plate 34, which is inserted in the corresponding projection 41, from separating from the bumper 31. Therefore, if a number of clips 40 become tangled in a container, it is very difficult to take out the clips 40 one by one, and the installation becomes less efficient.

SUMMARY OF THE INVENTION

Accordingly, it is a primary object of the present invention to provide a clip assembly which permits a secure and simple installation of a fitting member, such as an ornamental plate, to a base member, such as a bumper, and which increases the efficiency of the installation process.

To achieve the foregoing objects in accordance with the purpose of the present invention, a plurality of projections are formed on the base member, and a plurality of holes are formed in the fitting member. When the projections of the base member are inserted into the corresponding holes of the fitting member, these projections protrude outwardly, through the fitting member. The fitting member is secured to the base member by clamping the projections by means of the clips. Holding members are formed around the holes of the fitting member for holding the clips, prior to clamping the projections.

BRIEF DESCRIPTION OF THE DRAWINGS

The features of the present invention that are believed to be novel are set forth with particularity in the appended claims. The invention, together with the objects and advantages thereof, may best be understood by reference to the following description of the present embodiments together with the accompanying drawings, in which:

DETAILED DESCRIPTION OF THE PREFERRED EMBODIMENT

A preferred embodiment of a clip assembly according to the present invention will now be described referring to FIGS. 1 through 3.

Figure 1:
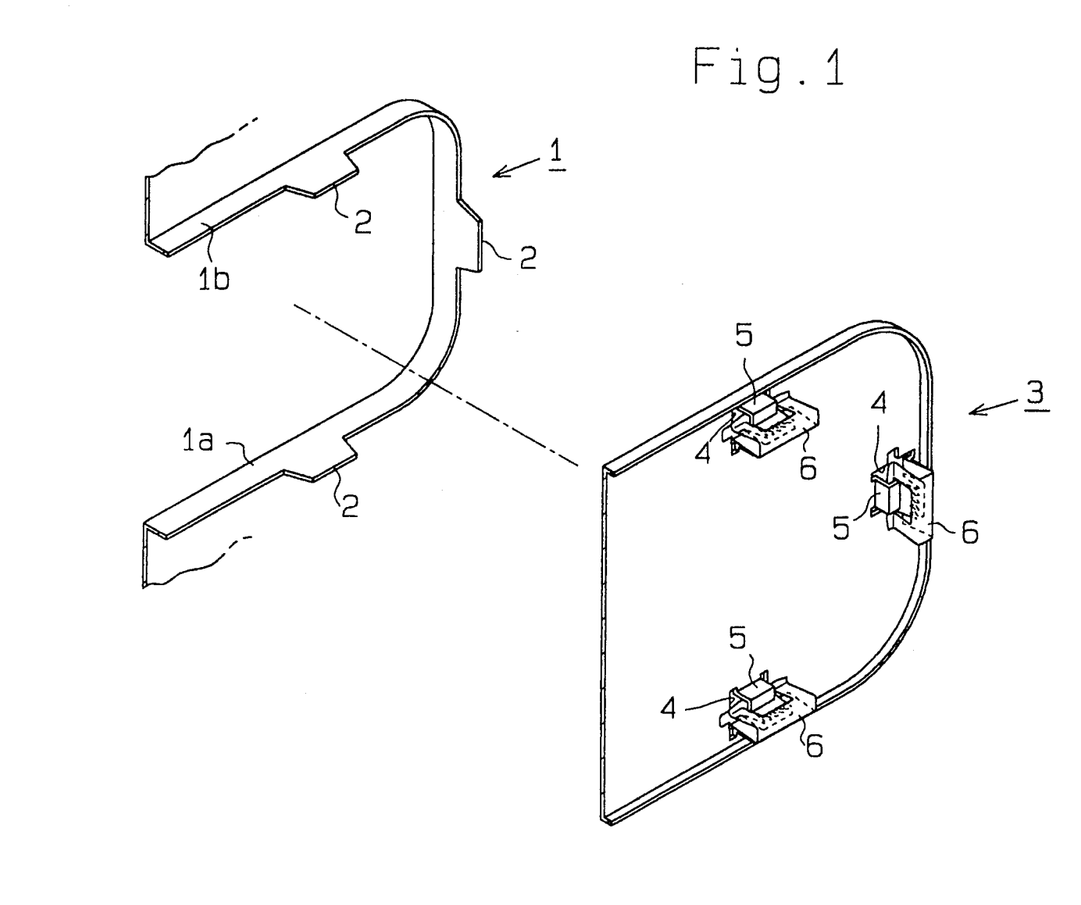
FIG. 1 is a fragmentary exploded perspective view illustrating a portion of the rear side of a bumper an ornamental plate and a plurality of clips utilized in a first embodiment according to the present invention.

As shown in FIG. 1, a bumper 1 (a base member) made of synthetic resin has an opening 1a. A rib 1b is formed along the peripheral edge of the opening 1a at the rear side of the bumper 1. A plurality of projections 2 are integrally formed with the rib 1b. In the present embodiment, there are six projections 2, but only three are shown in FIG. 1. The projections 2 are generally similar, and therefore only one projection 2 will be described hereafter. Each projection 2 is generally trapezoidally shaped, with its upper and narrower base forming the distal end of the projection 2, and its lower and the wider base forming the proximal end thereof. A plurality of though holes 4 are formed in an ornamental plate 3 (a fitting member), and correspond to the projections 2 of the bumper 1. Each projection 2 can be inserted into the corresponding through hole 4.

Figure 2:
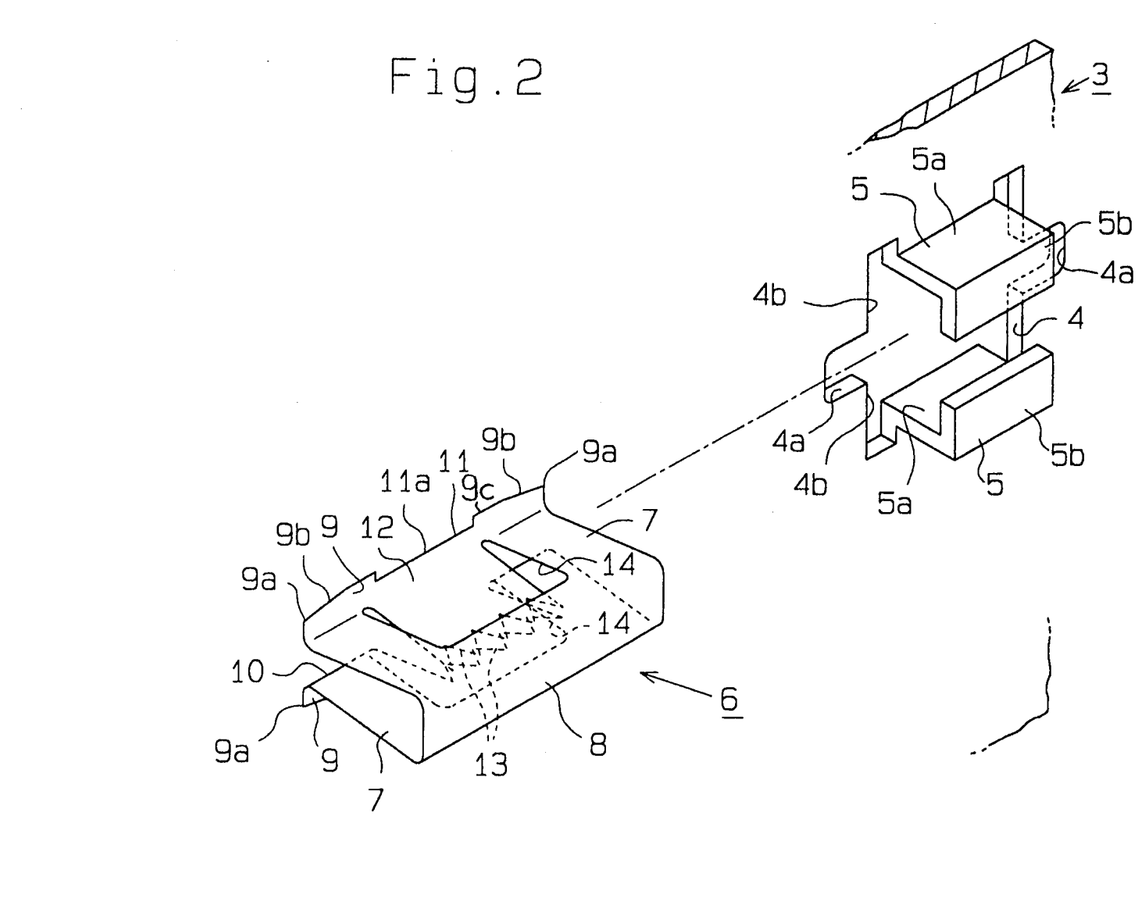
FIG. 2 is a fragmentary exploded perspective view illustrating a portion of the ornamental plate of FIG. 1, a holder and a clip according to the present embodiment.
Figure 3:
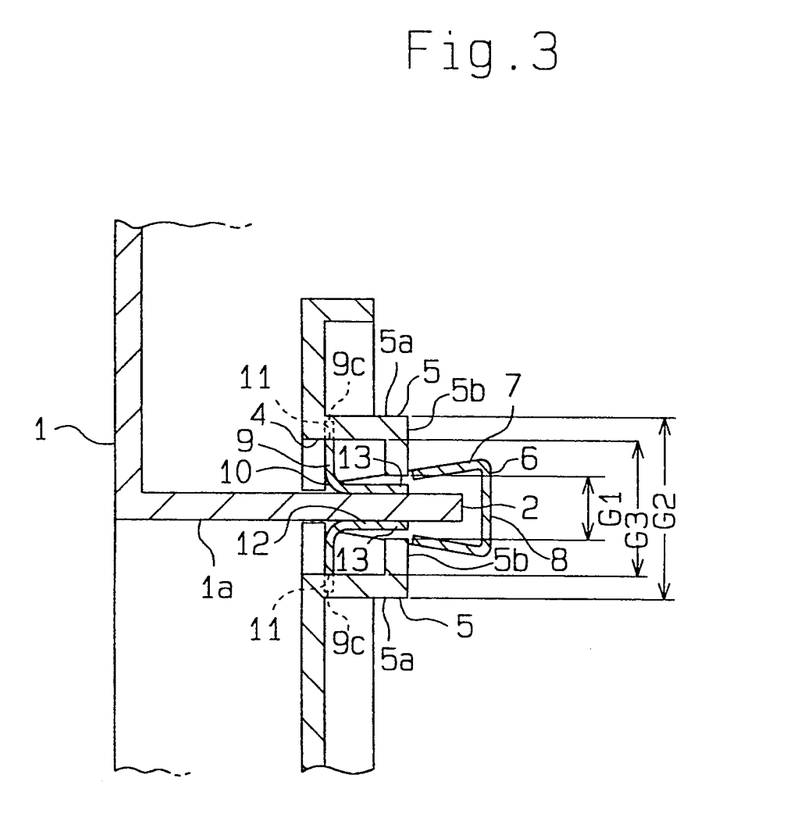
FIG. 3 is a fragmentary cross sectional view of an ornamental plate attached to the bumper by means of the clip.

As shown in FIG. 2, a pair of holders 5, which are located along the length of the through hole 4, have an L-shaped cross section, and are formed toward the rear side of the ornamental plate 3, at both sides of each through hole 4. Each of the pair of holders 5 includes a supporting portion 5a which extends perpendicularly from the ornamental plate 3, and a holding portion 5b which extends horizontally from the upper distal end of the supporting portion 5a, with respect to the ornamental plate 3. The distal ends of the holding portions 5b face each other.

As further illustrated in FIG. 2, the through hole 4 includes a middle portion 4a which has a substantially equal length with respect to that of the lower base of the projection 2, and a rather narrow width. The through hole 4 also includes end portions 4b which extend on either side of the middle portion 4a, and which extend into the supporting portion 5a of the holder 5. The middle portion 4a controls the position of the projection 2 by engaging it. The end portions 4b permit the holder 5 to be elastically deformed.

As shown in FIG. 2, each clip 6, is deformable, and is made of stainless steel. It has generally U-shaped cross section. The clip 6 includes two side walls 7 which are able to approach or separate from each other, and a base portion 8 which connects both side walls 7 together. The distal edge of each side wall 7 extends outwardly to form a contact wall or edge 9. A notch 11 engages the supporting portion 5a of the holder 5, and is formed at about the middle portion of the outer peripheral edge of each contact wall 9. A slit or opening 10 is formed between both side walls 7. The width of the opening 10 increases gradually from the contact walls 9, toward the base portion 8 of the clip 6.

A U-shaped opening or slit 14 is formed on each side wall 7 of the clip 6. A pair of opposing clamping plates 12 extend from the contact wall 9 toward the base portion 8. The opening 14 is wider than the length of the supporting portion 5a. Each clamping plate 12 is bent inwardly and disposed within the opening 10. The distance between the two opposing clamping plates 12 is narrower than the thickness of the projection 2, when the clip 6 is not in use. A plurality of saw teeth, such as the bites 13, are formed along the distal edge of each clamping plate 12.

At the contact walls 9, the width of the opening 10 is smaller than the distance G1 (FIG. 3) between the holding portions 5b of the holder 5. At the base portion 8, the width of the opening 10 is larger than the distance G1.

As illustrated in FIG. 2, each contact wall 9 includes a straight edge 9c which extends sideways from the notch 11, into a slanted edge 9b, and terminates at a corner 9a. The distance between the two straight edges 9c, at opposite contact walls 9, is larger than the distances G2 and G3 (FIG. 3) between the outer and inner surfaces, respectively, of the supporting surfaces 5a, when the clip 6 is not engaged with the holder 5.

Additionally, the distance between the two edges 11a (FIG. 2), of the opposite notches or recesses 11, is slightly larger than the distance G3, when the clip 6 is not engaged with the holder 5. The distance between the two corners 9a of the two opposite contact walls 9, is slightly smaller than the distance G3, when the clip 6 is not engaged with the holder 6.

As shown in FIG. 1, when the plate 3 is to be secured to the bumper 1, one clip 6 engages each of the corresponding holders 5. In order to accomplish such engagement, the clip 6 is inserted inside the holder 5, between the supporting portions 5a. The slanted edges 9b guide the clip 6 between the supporting portions 5a. As the straight edges 9c contact the supporting portions 5a, they force the clip 6 into deforming, slightly, inwardly, until the clip 6 snaps into engagement with the supporting portions 5a, the recesses 11 securely retaining these supporting portions 5a.

The side walls 7 of the clip 6 deform back toward their original unstressed position, thus causing the holding portions 5b to partially enter the corresponding openings 14, further engaging the clip 6. When the clip 6 engages the holder 5, the opening 10 faces the middle portion 4a of the through hole 4.

When all the holders 5 are provided with clips 6, the ornamental plate 3 is secured to the bumper 1. As shown in FIG. 1, the plate 3 is urged against the bumper 1, such that the projections 2 of the bumper 1 are inserted into the corresponding through holes 4 of the plate 3. Therefore, as shown in FIG. 3, each projection 2 is clamped by the corresponding clamping plates 12 after insertion through the corresponding through hole 4 and then fitted into the corresponding opening 10 of the clip 6. Consequently, the plate 3 is temporarily secured to the bumper 1.

The clips 6 are then urged against the ornamental plate 3 until the plate 3 contacts the rib 1b of the bumper 1, and the contact walls 9 of the clips 6 contact the rear surface of the plate 3. As the projections 2 are pushed deeper into the corresponding clips 6, the bites 13 of the clips 6 act against the projections 2. Therefore, each clip 6 is securely fitted into the corresponding projection 2, so that the ornamental plate 3 is secured to the bumper 1 by the clips 6.

As described above, in this embodiment, the clips 6 are temporarily held by the holders 5 of the plate 3, and the plate 3 is secured to the bumper 1 by the clips 6. Therefore, the installation of the ornamental plate 3 is made easier and more efficient. The number of steps required for installing the ornamental plate is also reduced, thus leading to a reduction in labor and installation time.

In the present embodiment, the holder 5 is elastically deformable since the end portion 4b of the through hole 4 is formed in the vicinity of the holder 5. Therefore, the clip 6 can be inserted into the holder 5 through the narrow gap defined between the pair of the holding portions 5b. No excessive load is applied on the ornamental plate 3 because of the elastic deformability of the holder 5 by its resulting engagement with the clip 6.

Figure 4:
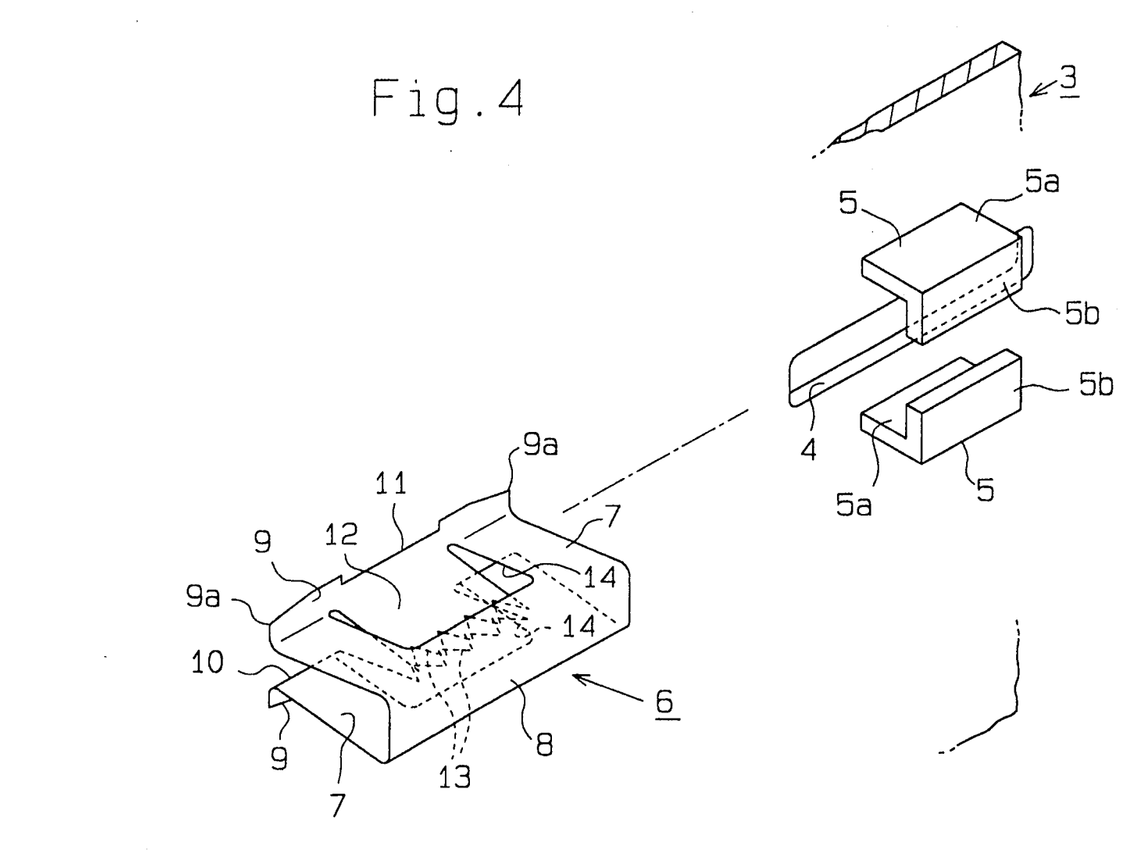
FIG. 4 is a fragmentary exploded perspective view of the clip and a holder according to another embodiment.

Although only one embodiment of the present invention has been described herein, it should be apparent to those skilled in the art that the present invention may be embodied in many other specific forms without departing from the spirit or scope of the invention. Particularly, it should be understood that the following embodiments are contemplated by the present invention:

(1) In the above-described embodiment, the end portion 4b is formed in the through hole 4 of the ornamental plate 3. However, as shown in FIG. 4 the end portion 4b can be omitted, and the through hole 4 is reduced in size. This design will preserve the aesthetic appearance of the ornamental plate 3.

Figure 5:
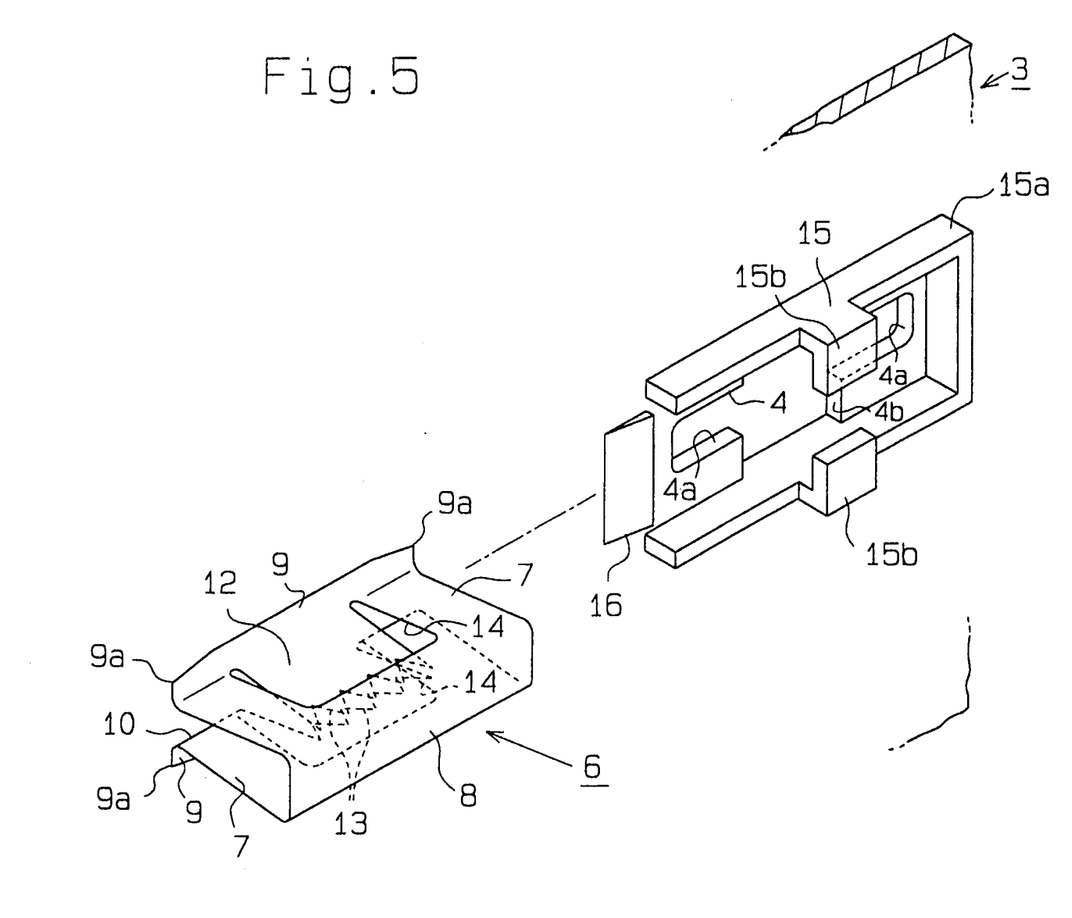
FIG. 5 is a fragmentary exploded perspective view of the clip and a holder according to yet another embodiment.

(2) In the above-described embodiment, the positioning of the clips 6 is performed by the engagement between the notches 11 of the clips 6 and the holders 5, and between the openings 14 of the clips 6 and the holders 5. However, as shown in FIG. 5, a positioning wall 15a, which is generally C-shaped, can be formed around the through hole 4, and a holder 15 can be formed on the positioning wall 15a. On the outside of the opening portion of the positioning wall 15a, a stopper 16 which is inclined toward the insertion direction of the clip, prevents the clip from becoming detached.

In this case, the clip 6 is attached to the holder 15 while it is guided along the inclined surface of the stopper 16. After the clip 6 is attached, it is secured by the stopper 16 and the positioning wall 15a. Therefore, the notch 11 of the clip 6 can be eliminated. Furthermore, the clip 6 can be more securely held.

Further, the width of the holding portion 15b of the holder 15 can be set narrower than that of the opening 14 of the clip 6. At this time, the holding portion 15b does not perform a position control function along the insertion direction of the clip, but only performs a position control function along the direction perpendicular to the insertion direction of the clip, in order to prevent the clip 6 from becoming detached from the holder 15.

(3) The present invention can be used with different base components and fitting components than the bumper 1 and ornamental plate 3. The composition of these components could be selected from a variety of suitable materials that are not expressly described herein.

What is claimed is:

1. A clip assembly for connecting a base member and a fitting member, the assembly comprising:
    said base member including at least one projection;
    said fitting member including at least one through hole for receiving said projection;
    at least one clip for clamping to said projection, and for securing said fitting member to said base member; and
    a holding member formed on said fitting member, said holding member including a pair of holding pieces formed along opposite sides of said through hole, for retaining said clip therebetween, as said projection is clamped by said clip.

2. The assembly according to claim 1, wherein said base member includes an opening, and said at least one projection is formed along the periphery of said opening; and wherein said fitting member covers at least part of said opening.

3. The assembly according to claim 1, wherein said clip further includes:
    a pair of oppositely disposed side walls;
    a base portion which connects said side walls; and
    a clamping plate formed in at least one side wall, for clamping said projection.

4. The assembly according to claim 3, wherein one of said clamping plates is formed in each of said side walls.

5. The assembly according to claim 4, wherein each of said side walls extends into an edge and terminates at a contact wall; and
    wherein each said edge engages said fitting member, when said clip is secured to said holding member.

6. The assembly according to claim 5, wherein said contact wall further includes a slanted edge for helping to guide said clip inside said holding member.

7. The assembly according to claim 5, wherein each said contact wall includes a notch which engages a respective one of said holding pieces.

8. The assembly according to claim 4, wherein said side wall includes an opening, and said holding piece engages said side wall opening when it is connected to said clip.

9. The assembly according to claim 1, wherein said base member is a vehicle bumper; and wherein said fitting member is an ornamental plate.

10. A clip assembly for connecting a base member and a fitting member, the assembly comprising:
    said base member including at least one projection;
    said fitting member including at least one through hole for receiving said projection;
    a clip for clamping to said projection, and for securing said fitting member to said base member; said clip including:
    a pair of oppositely disposed side walls;
    a base portion which connects said side walls; and
    a pair of clamping plates which are formed respectively in each of said side walls, for clamping said projection; and
    a holding member disposed around the periphery of said through hole, for retaining said clip, as said projection is clamped by said clip.

11. The assembly according to claim 10, wherein each of said side walls extends into an edge and terminates at a contact wall; and
    wherein said edge engages said fitting member, when said clip is secured to said holding member.

12. The assembly according to claim 11, wherein said contact wall includes a notch which engages said holding piece.

13. The assembly according to claim 11, wherein said contact wall further includes a slanted edge for helping to guide said clip inside said holding member.

14. The assembly according to claim 10, wherein said side wall includes an opening, and said holding piece engages said side wall opening when it is connected to said clip.

15. The assembly according to claim 10, wherein said clip and said holding member each have opposite ends, said opposite ends of said clip engaging said opposite ends of said holding member when said projection is clamped in said clip, one of said opposite ends of said holding member being tapered to form a ramp for guiding said clip into said holding member.

16. A clip assembly for connecting a base member and a fitting member, the assembly comprising:
   said base member including at least one projection;
   said fitting member including at least one through hole for receiving said projection;
   a clip for clamping to said projection, and for securing said fitting member to said base member;
   a C-shaped positioning wall disposed around the periphery of said through hole; and
   a holding member on said positioning wall, said holding member including a pair of holding pieces disposed along opposite sides of said through hole, for retaining said clip therebetween, as said projection is clamped by said clip.

17. The assembly according to claim 16, wherein said C-shaped positioning wall includes an opening portion for receiving said clip within said holding member, and further comprises an inclined surface on said fitting member adjacent to said opening portion for guiding the insertion of said clip and retaining said clip after insertion.

18. The assembly according to claim 17, wherein said clip further includes:
   a pair of oppositely disposed side walls;
   a base portion which connects said side walls; and
   a clamping plate formed in each of said side walls, for clamping said base projection.

19. The assembly according to claim 17, wherein said base member is a vehicle bumper; and wherein said fitting member is an ornamental plate.

* * * * *